UNITED STATES PATENT OFFICE.

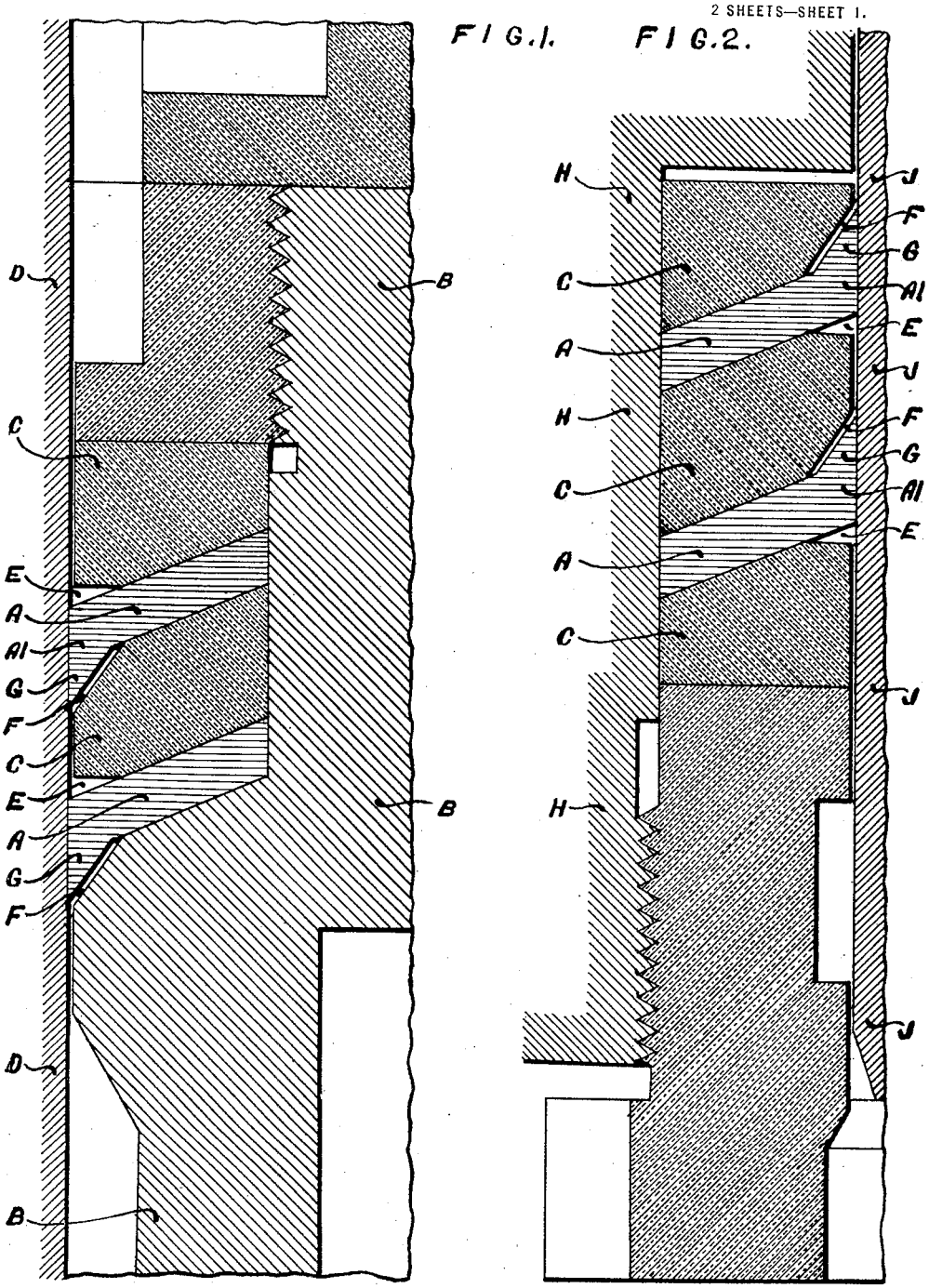

ANGUS MURRAY AND ANGUS ROBERTSON MURRAY, OF GLASGOW, SCOTLAND.

PACKING DEVICE FOR PISTONS, RAMS, RODS, AND THE LIKE.

1,347,351.

Specification of Letters Patent.

Patented July 20, 1920.

Application filed July 29, 1919. Serial No. 314,175.

*To all whom it may concern:*

Be it known that we, ANGUS MURRAY and ANGUS ROBERTSON MURRAY, subjects of the King of Great Britain and Ireland, and both residents of Glasgow, Scotland, have invented certain new and useful Improvements in Packing Devices for Pistons, Rams, Rods, and the like, of which the following is the specification.

The invention relates to piston and like packing devices of the type having rings of malleable or deformable metal supported by gland rings or the like, and has for its object to provide improved, simple, and effective forms of such packing devices for pistons, rams, rods and the like more particularly adapted for operation under heavy pressure, under which conditions fluid tightness is maintained without undue friction.

A packing device made according to the invention comprises essentially one or more rings each having an acting or joint-forming lip (or lips) so inclined against the direction of fluid pressure that it acts as a strut or buttress against the surface where joint is to be made. This jointing ring is of a metal or alloy of such malleability or deformability that its lip is deformed or obtruded against the joint-surface, and it is so held that there is freedom for this deformation to take place in use and so maintain joint-tightness.

The jointing ring may be of conical section, its radial width being greater than its thickness, or it may be formed with a conical lip or buttress part where it abuts the jointing surface which may be either external or internal to it. Or it may be of double-conical or doubly conical-lipped section abutting jointing surfaces both external and internal. Or again it may be of conoidal or curvilinear section. In any form, the acting lip may be provided with a reinforcing part behind it. The improved ring, or preferably a series of them, are so supported in gland rings or the like that the acting lips are free to deform under pressure in the manner set forth, the rings being so positioned that pressure in the direction in which they act tends to expand them, while where there is reversal of the direction of pressure, two oppositely facing series of rings may be used.

Figure 3:
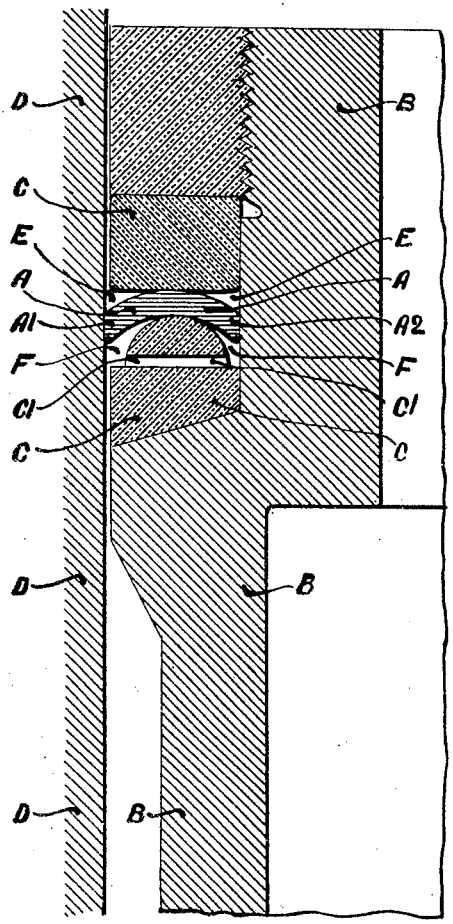
Figure 4:
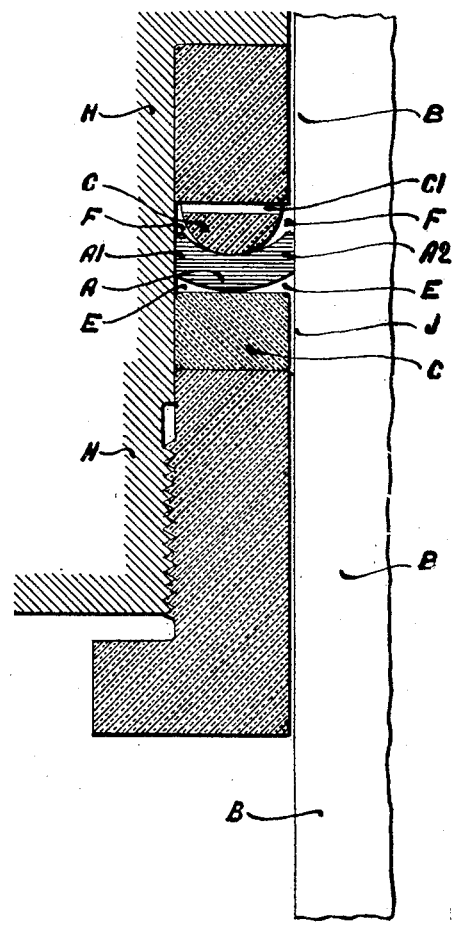

Examples of the improved packing device are shown to a very considerably enlarged scale in sectional elevation on two accompanying sheets of explanatory drawings, Figure 1, Sheet 1, showing the application of conical rings where the jointing surface is external to the rings, Fig. 2 like rings where the jointing surface is internal to them, while Figs. 3 and 4, Sheet 2, correspondingly show the application of rings of curvilinear section.

In the example shown in Fig. 1, the rings A of conical section are secured on a ram B by gland rings C which are so shaped that while they firmly hold the inner periphery of the rings, the buttress like parts $A^1$ at their outer peripheries and which make joint with the cylinder surface D, are free to deform, there being here provided clearance spaces E F. The buttress parts $A^1$ of the rings are reinforced by extensions G.

The example shown in Fig. 2 only differs in that the rings A are held in a gland H and their inner peripheries make joint with a ram or piston rod J.

In the example shown in Figs. 3 and 4, the rings A are of curvilinear section, that is to say, they have buttress like parts $A^1$, $A^2$ at both their inner and their outer peripheries. In Fig. 3 the outer periphery of the ring makes joint with the cylinder surface D, while the inner periphery makes joint with the ram B on which it is carried. Pressure fluid has access to both these peripheries by way of ports $C^1$ in the adjacent gland ring C.

Fig. 4 only differs in that the sliding jointing surface J is internal to the ring A.

In the claims it is to be understood that the word "conoidal" is intended to cover constructions of rings which are either conical or approximately conical, or curvilinear in form, and that where the word "lip" is used the plural is implied where the construction calls for it.

What we claim is:—

1. In a packing device for pistons, rams, rods and the like, a number of conoidal rings of a malleable or deformable metal or alloy, the ring being of radial width greater than its thickness, a joint forming lip on the ring and means for so supporting the ring that its lip is free to act under pressure as a strut or buttress against the surface where joint is to be made.

2. In a packing device for pistons, rams, rods and the like, a number of rings of a malleable or deformable metal or alloy having a joint forming lip so inclined against the direction of fluid pressure that it acts under pressure as a strut or buttress against the surface where joint is to be made, a reinforced or thickened part behind the lip, and means for so supporting the ring that its lip is free to act as described.

3. In a packing device for pistons, rams, rods and the like, a number of rings of a malleable or deformable metal or alloy having a joint forming lip so inclined against the direction of fluid pressure that it acts under pressure as a strut or buttress against the surface where joint is to be made, a reinforced or thickened part behind the lip, and gland rings with clearance spaces between them and the lip of the packing ring to hold the latter ring in position.

4. In a packing device for pistons, rams, rods and the like, a number of conoidal rings of a malleable or deformable metal or alloy, the ring being of radial width greater than its thickness, a joint forming lip on the ring, a reinforced or thickened part behind the lip, gland rings to hold the packing ring in position, and clearance spaces between the gland rings and the lip of the packing rings.

In testimony whereof we have signed our names to this specification.

ANGUS MURRAY.
ANGUS ROBERTSON MURRAY.